(12) United States Patent
Tournebize et al.

(10) Patent No.: US 10,767,642 B2
(45) Date of Patent: Sep. 8, 2020

(54) POSITIVE-DISPLACEMENT PISTON PUMP AND ASSOCIATED DELIVERY CONTROL METHOD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Aurélien Tournebize, Clermont-Ferrand (FR); Pierre Annet, Clermont-Ferrand (FR); Christophe Pierre, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 23 days.

(21) Appl. No.: 15/323,211

(22) PCT Filed: Jun. 30, 2015

(86) PCT No.: PCT/EP2015/064776
§ 371 (c)(1),
(2) Date: Dec. 30, 2016

(87) PCT Pub. No.: WO2016/001186
PCT Pub. Date: Jan. 7, 2016

(65) Prior Publication Data
US 2017/0130707 A1   May 11, 2017

(30) Foreign Application Priority Data

Jun. 30, 2014 (FR) .................................. 14 56213

(51) Int. Cl.
*F04B 49/02* (2006.01)
*F04B 49/06* (2006.01)
(Continued)

(52) U.S. Cl.
CPC ............ *F04B 49/022* (2013.01); *F04B 13/00* (2013.01); *F04B 49/065* (2013.01); *F04B 49/08* (2013.01); *F04B 49/22* (2013.01); *F04B 2205/04* (2013.01)

(58) Field of Classification Search
CPC .... F04B 49/08; F04B 49/022; F04B 2205/04; F04B 2205/13; F04B 2205/05; F04B 49/06; F04B 49/065; F04B 49/22; F04B 13/00
See application file for complete search history.

(56) References Cited

U.S. PATENT DOCUMENTS 7,726,179 B2   6/2010  Müller et al.
7,959,420 B1 *  6/2011  Sperry .................. F04B 49/022
                                                     137/512.1
(Continued)

FOREIGN PATENT DOCUMENTS

FR    2668206  A1    4/1992
FR    2911374   *    7/2008
(Continued)

OTHER PUBLICATIONS

English translation of FR2911374, Beaudionnet, generated Jul. 31, 2018.*
International Search Report dated Sep. 30, 2015.

*Primary Examiner* — Bryan M Lettman
(74) *Attorney, Agent, or Firm* — Dickinson Wright PLLC

(57) ABSTRACT

A volumetric pump comprising a product metering chamber, a metering piston mounted inside the chamber so as to slide between top dead center and bottom dead center, a sleeve at least partially delimiting an intake chamber and an exhaust chamber for the product, and a product dispenser that is mounted so as to be able to move with respect to the sleeve and is able to place the metering chamber alternately into communication with the intake chamber and the exhaust (Continued)

chamber is provided. The pump also comprises a pressure sensor that is able to measure the pressure of the product inside the metering chamber, and a control unit that is connected to the pressure sensor and is able to verify the presence of pressure peaks exhibiting a value greater than or equal to a predetermined pressure threshold.

10 Claims, 4 Drawing Sheets

(51) Int. Cl.
*F04B 49/22* (2006.01)
*F04B 49/08* (2006.01)
*F04B 13/00* (2006.01)

(56) References Cited

U.S. PATENT DOCUMENTS

2008/0190176 A1* 8/2008 Muller ............... F04B 43/0072
73/37
2013/0202456 A1 8/2013 Lucas et al.

FOREIGN PATENT DOCUMENTS

| FR | 2911374 A1 | 7/2008 |
| WO | 2006108606 A1 | 10/2006 |
| WO | 2012046162 A1 | 4/2012 |

\* cited by examiner

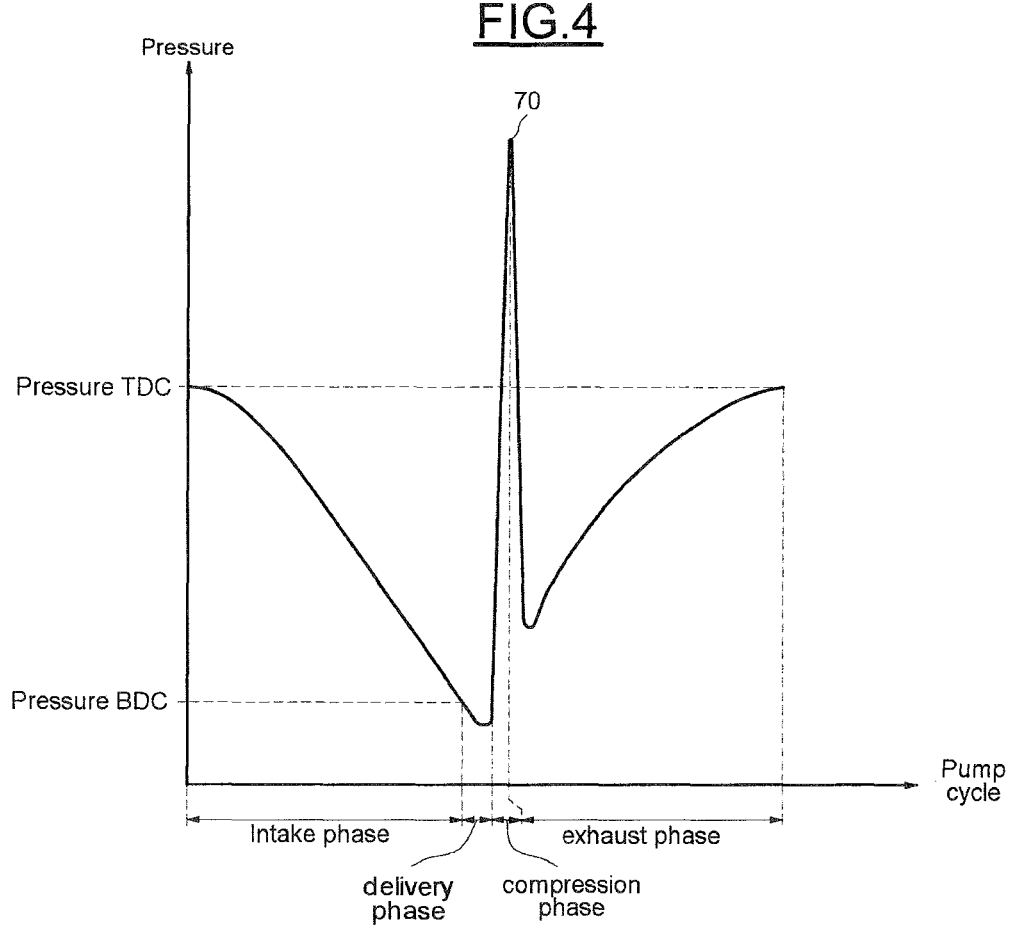

POSITIVE-DISPLACEMENT PISTON PUMP AND ASSOCIATED DELIVERY CONTROL METHOD

This application is a 371 national phase entry of PCT/EP2015/064776, filed 30 Jun. 2015, which claims benefit of French Patent Application No. 1456213, filed 30 Jun. 2014, the entire contents of which are incorporated herein by reference for all purposes.

BACKGROUND

1. Technical Field

The present invention relates to the field of positive-displacement piston pumps, and more particularly to a method for controlling the flow rate of such a pump.

An advantageous application relates to the supply of rubber to an extruder intended to form a profiled element for manufacturing a vehicle tire.

2. Related Art

Conventionally, a positive-displacement pump or volumetric pump comprises a product metering piston mounted in a cylinder of the pump body forming the metering chamber so as to slide between top dead center and bottom dead center, and means for actuating the piston, for example a cam in contact with one end of the latter.

One type of positive-displacement pump comprises a cylinder mounted so as to slide with respect to a sleeve of the pump body in order to place the metering chamber alternately into communication with an intake chamber and an exhaust chamber of the sleeve, by way of two orifices that are provided in the thickness of said sleeve and are each specific to the intake or exhaust of the product. The cylinder of the pump comprises inlet and outlet flaps that can close off the intake and exhaust orifices, respectively. For more details relating to a pump of this type, reference may be made for example to the patent application FR-A1-2 668 206.

Another type of positive-displacement pump comprises a dispensing plug mounted so as to rotate inside the sleeve of the pump body in order to place the metering chamber alternately into communication with the intake chamber and the exhaust chamber, by way of a single orifice provided in the thickness of the sleeve.

To this end, first and second groups of grooves are formed on the outer surface of the plug and are arranged so as to pass in front of the orifice in the sleeve during the rotation of the plug so as to place the metering chamber successively into communication with the intake chamber and then with the exhaust chamber.

Thus, the pumped product flows from the intake chamber to the metering chamber, and then from this metering chamber to the exhaust chamber, passing through the same orifice. For more details relating to a pump of this type, reference may be made for example to the patent application EP-A1-0 604 888.

With such continuously metering positive-displacement pumps, the piston is moved from top dead center to bottom dead center only under the effect of the pressure of the product flowing towards the metering chamber. Therefore, a lack of product pressure in the intake chamber can result in the metering chamber not being filled. The flow rate of the pump can thus be irregular.

In order to control the regularity of the flow rate of the pump, the patent application FR-A1-2 911 374 describes a method in which an electrical contact between the actuating cam of the metering piston and said piston has to be detected within a predetermined time limit starting from a reference position of the cam.

If the pressure of the product is too low during the intake phase, the piston does not reach bottom dead center and the electrical contact is detected outside the predetermined time limit. By contrast, if the pressure of the product is sufficiently high during this intake phase, the piston reaches bottom dead center and the electrical contact is detected within the predetermined time limit. In this case, the exhaust flow rate of the pump is considered to be regular.

However, for high speeds of the piston and of the dispensing means, the electrical contact between the cam and the piston can be obtained outside this predetermined time limit, for example given the inertia of the piston and the viscoelasticity of the product to be metered, even though the metering chamber is correctly filled. Moreover, such a control method is not applicable when the product to be metered is electrically conductive.

SUMMARY

The present invention aims to overcome the above-mentioned drawbacks.

More particularly, the present invention aims to provide a method for controlling the flow rate of a pump which makes it possible to reliably verify that the metering chamber of said pump is being filled and which is applicable both to insulating and electrically conductive products to be metered.

In one embodiment, the method for controlling the flow rate of a volumetric pump of the type comprising a product metering chamber, a metering piston mounted inside said chamber so as to slide between top dead center and bottom dead center, and an intake chamber and an exhaust chamber for said product that are placed alternately in communication with said metering chamber comprises the steps in which the pressure of the product inside the metering chamber is measured during at least one pump cycle, and the presence of a pressure peak having a value greater than or equal to a predetermined pressure threshold is verified during a compression phase of said pump cycle, the metering chamber being closed during said compression phase so as not to be in communication with the intake and exhaust chambers, and the metering piston moving towards top dead center during said compression phase.

During the compression phase of the product, the metering chamber is completely closed and thus isolated from the intake chamber and the exhaust chamber. The detection of such a pressure peak during this phase makes it possible to ensure the correct filling of the metering chamber. This is because the control pressure threshold is chosen depending on the desired minimum filling volume of the metering chamber. The verification of the presence of a pressure peak having a pressure value greater than or equal to the predetermined threshold ensures that the desired volume of product has been injected into the exhaust chamber.

If the quantity of product admitted into the chamber is too small, the pressure peak created has a pressure value less than the threshold value. This makes it possible to detect an irregularity in the flow rate of the pump. The pressure peak created during the compression phase specifically provided to this end depends on the state of compression of the product inside the metering chamber and thus on the volume of product present.

In a preferred embodiment, the pressure of the product inside the metering chamber is measured during a plurality of successive pump cycles, and the presence of pressure peaks is verified during the compression phase of each of said cycles.

According to an optional feature of the method, a warning is output if the ratio between the number of pressure peaks detected and the number of pump cycles is less than a predetermined warning threshold.

This pressure threshold can advantageously be defined in accordance with the flow rate of said pump and the type of product pumped.

The present invention also relates to a volumetric pump comprising a product metering chamber, a metering piston mounted inside said chamber so as to slide between top dead center and bottom dead center, a sleeve at least partially delimiting an intake chamber and an exhaust chamber for said product, and a product dispensing means that is mounted so as to be able to move with respect to the sleeve and is able to place the metering chamber alternately into communication with the intake chamber and the exhaust chamber.

The pump also comprises a means for measuring the pressure of the product inside the metering chamber, and a control unit that is connected to the measuring means and is able to verify the presence of pressure peaks exhibiting a value greater than or equal to a predetermined pressure threshold.

Preferably, the measuring means is able to measure the pressure of the product in a zone of the metering chamber that is situated above top dead center of the metering piston.

In one embodiment, an active part of the measuring means is mounted in an orifice formed in the thickness of a cylinder of said pump that delimits the metering chamber. Alternatively, the active part of the measuring means can be mounted inside the metering chamber.

Preferably, the control unit comprises software means that are able to calculate the ratio between the number of pressure peaks detected and the number of pump cycles carried out, and to trigger a warning when this ratio is less than a predetermined warning threshold.

In one embodiment, the dispensing means is mounted so as to be able to rotate inside the sleeve and comprises grooves that are designed to make it possible to place the metering chamber alternately into communication with the intake chamber and the exhaust chamber, and to temporarily isolate said metering chamber from any communication with said intake and exhaust chambers.

BRIEF DESCRIPTION OF THE DRAWINGS

The present invention will be understood better from reading the detailed description of an embodiment considered by way of entirely non-limiting example and illustrated by the appended figures, in which:

FIGS. 3 and 4 are curves showing the change in pressure of the metered product that is measured inside a metering chamber of the pump in FIGS. 1 and 2 during several successive pump cycles and during a single cycle, respectively.

DETAILED DESCRIPTION OF EXAMPLE EMBODIMENTS

Figure 1:
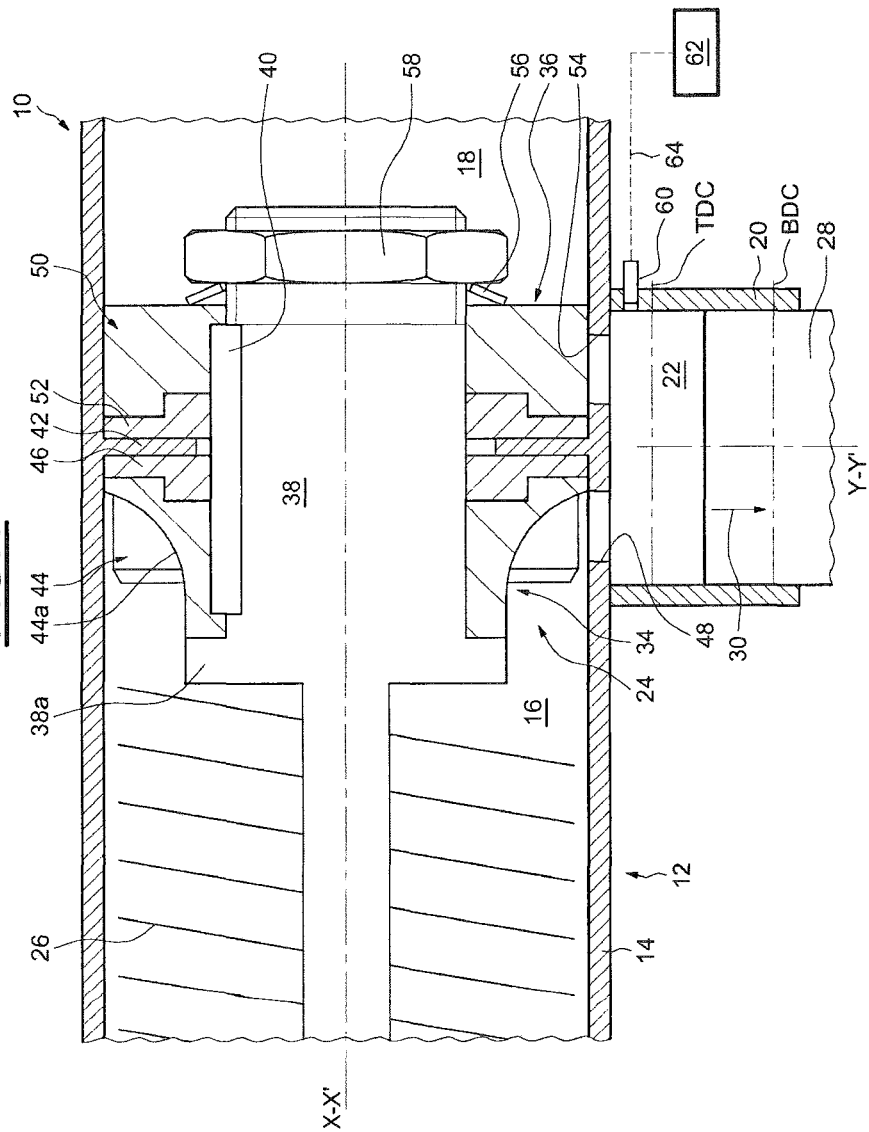
FIG. 1 is a partial schematic view in cross section of a volumetric pump according to one exemplary embodiment of the invention in an intake position for the product.
Figure 2:
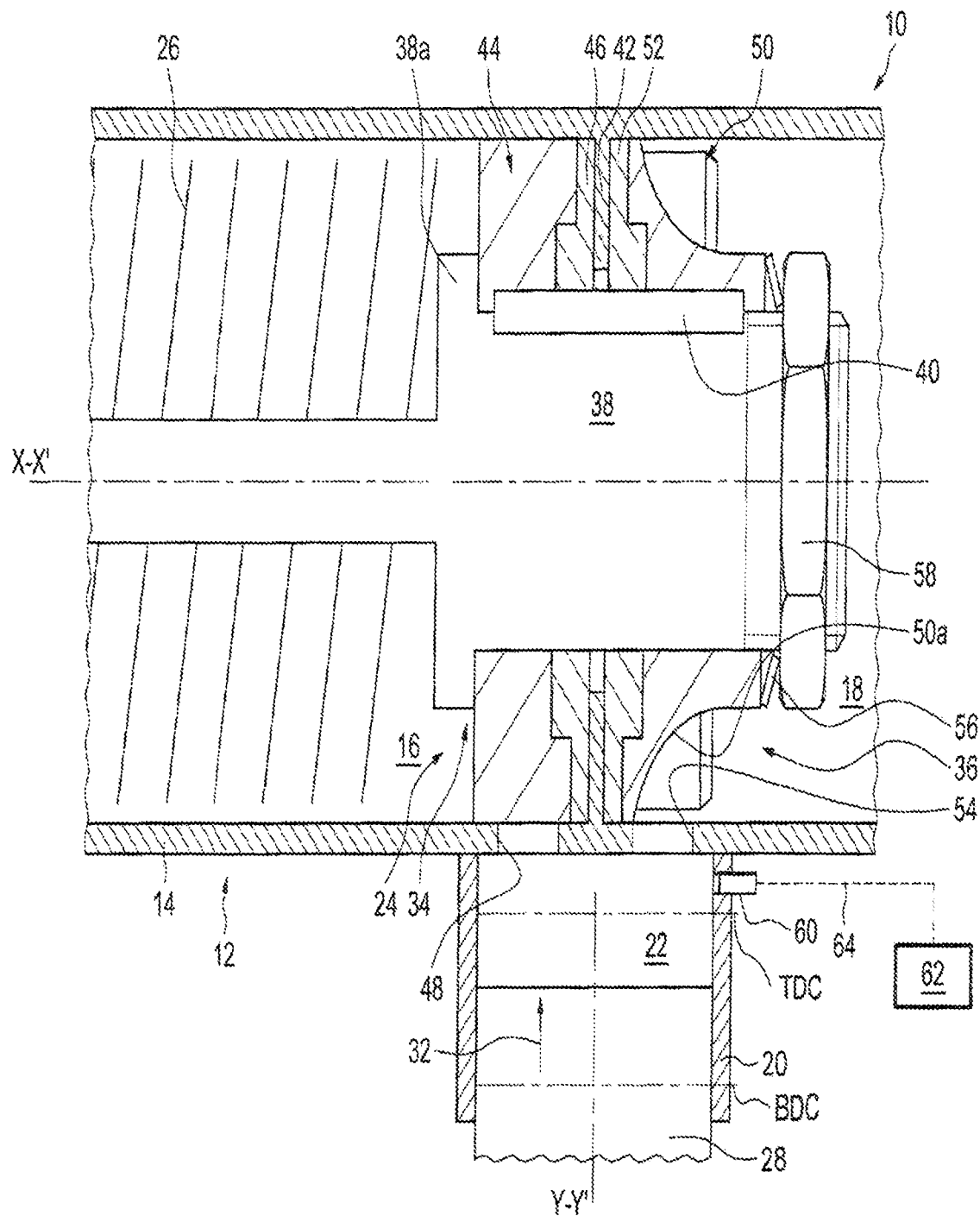
FIG. 2 is a partial schematic view in cross section of the pump from FIG. 1 in an exhaust position for said product.

FIGS. 1 and 2 show an exemplary embodiment of a volumetric pump, bearing the overall reference 10, provided for dispensing a viscous product, such as an elastomer that can be made of non-vulcanized rubber.

The pump 10 comprises a pump body 12 provided with a sleeve 14 delimiting an intake chamber 16 and an exhaust chamber 18, and with a cylinder 20 delimiting a metering chamber 22. The sleeve 14 has an axis X-X' of elongation and the cylinder 20 has an axis Y-Y' of elongation orthogonal to the axis X-X'. The cylinder 20 is fixed to the sleeve 14. In the exemplary embodiment illustrated, the metering chamber 22 is offset radially outwards with respect to the intake chamber 16 and exhaust chamber 18. Throughout the description, the terms "axial, radial and circumferential" are defined with respect to the axis X-X'.

The pump 10 also comprises a product dispensing means 24 which is mounted so as to be able to rotate inside the sleeve 14 about the axis X-X' and is designed to place the metering chamber 22 alternately into communication with the intake chamber 16 and the exhaust chamber 18 by way of two different members. The intake chamber 16 and exhaust chamber 18 are separated from one another by the dispensing means 24.

In the exemplary embodiment illustrated, the pump 10 also comprises a feed screw 26 of the endless type that is disposed in the intake chamber 16 and makes it possible to ensure that the product is moved from an introduction orifice (not shown) of the chamber in the direction of the dispensing means 24 and to pressurize the pumped product. The dispensing means 24 is secured to the screw 26 and the axis X-X' of said means is coincident with that of the screw. Alternatively, it is possible to provide some other feed means for obtaining the forced mechanical transfer of the product towards the dispensing means 24 against which said product is pressed under pressure.

The pump 10 also comprises a product metering piston 28 which is mounted inside the metering chamber 22 so as to slide along the axis Y-Y'. The sliding movement of the metering piston 28 is perpendicular to the rotation axis X-X' of the dispensing means 24. The piston 28 is mounted so as to slide between positions of maximum and minimum volume of the metering chamber 22 which correspond respectively to bottom dead center BDC and top dead center TDC of said piston. In FIGS. 1 and 2, top dead center and bottom dead center are illustrated schematically by dashed lines.

During an intake phase of the pump cycle which is illustrated in FIG. 1, under the effect of the pressure of the product which is dispensed by the dispensing means 24 from the intake chamber 16 to the metering chamber 22, the piston 28 moves from top dead center TDC to bottom dead center BDC. This movement toward bottom dead center is illustrated schematically by the arrow bearing the reference 30. As will be described in more detail below, the pump 10 comprises means for ensuring the correct filling of the metering chamber 22.

During an exhaust phase of the pump cycle illustrated in FIG. 2, the piston 28 moves towards top dead center under the effect of actuating means (not shown) of said pump. This movement toward top dead center is represented by the arrow bearing the reference 32. The actuating means can for example comprise a cam mounted in contact with the lower end of the metering piston 28.

In the exemplary embodiment illustrated, the dispensing means 24 comprises an intake member 34 for the product, an exhaust member 36 for said product that is spaced apart axially from said intake member, and a common support shaft 38 of axis X-X' on which said members are mounted. The annular intake and exhaust members 34, 36 rotate as one with said shaft 38 by way of a key 40. The intake and exhaust members 34, 36 can slide axially on the shaft 38 along the key 40. The shaft 38 is secured to the feed screw 26.

The intake and exhaust members 34, 36 are disposed axially on either side of an internal partition 42 of the sleeve and bear axially against said partition. The partition 42, of annular shape, axially separates the intake chamber 16 from the exhaust chamber 18. The partition 42 extends inwards from the bore of the sleeve. The partition 42 extends radially into the vicinity of the support shaft 38, remaining at a radial distance therefrom. The partition 42 has two opposite flat front faces against each of which one of the intake and exhaust members 34, 36 bears axially.

The dispensing means 24 also comprises an annular washer 56 that is mounted on the shaft 38 and bears axially against the exhaust member 36 on the side away from the partition 42 of the sleeve, and a nut 58 that is screwed onto a threaded part of said shaft (not referenced) and axially blocks the washer 56. The washer 56 can be for example of the Belleville type.

The intake member 34 is disposed in the intake chamber 16. The intake member 34 comprises a body 44 and a friction ring 46 mounted so as to bear axially against said body. The body 44 and the friction ring 46 rotate as one with the shaft 38 by way of the key 40. The body 44 is mounted so as to bear axially against a shoulder 38a of the shaft and the friction ring 46 bears axially against the partition 42 of the sleeve. The shoulder 38a of the shaft is situated in this case at one axial end of the shaft and extends radially outwards. The body 44 of the intake member comprises a plurality of recesses or grooves 44a that are formed on its outer surface and lead onto the front face of said body that is oriented axially towards the intake chamber 16. The grooves 44a are spaced apart from one another in the circumferential direction, preferably in a regular manner.

During the rotation of the intake member 34, and more generally of the dispensing means 24, the grooves 44a pass in front of an inlet orifice 48 of the metering chamber 22. The grooves 44a place the metering chamber 22 into fluidic communication with the intake chamber 16.

The exhaust member 36 has a similar design to that of the intake member 34. The exhaust member 36 is disposed in the exhaust chamber 18. The exhaust member 36 comprises a body 50 and a friction ring 52 mounted so as to bear axially against said body 50. The body 50 and the friction ring 52 rotate as one with the shaft 38 by way of the key 40. The friction ring 52 is mounted so as to bear axially against the partition 42 of the sleeve on the side axially away from the intake member 34. Advantageously, each friction ring 42, 52 is made of a material that has a low coefficient of friction and can have self-lubricating properties and good resistance to wear, for example bronze, graphite, etc.

The body 50 comprises a plurality of recesses or grooves 50a that are formed in its outer surface, lead onto the front face of said body that is oriented axially towards the exhaust chamber 18 and are spaced apart from one another in the circumferential direction. During the rotation of the dispensing means 24, the grooves 50a pass in front an outlet orifice 54 of the metering chamber 22. The grooves 50a place the metering chamber 22 into fluidic communication with the exhaust chamber 18.

In the exemplary embodiment illustrated, the inlet orifice 48 and the outlet orifice 54 are formed in the thickness of the sleeve 14 of the pump body and lead into the metering chamber 22. The orifices 48, 54 in this case extend radially through the thickness of the sleeve 14. The orifices 48, 54 are situated radially facing the metering piston 26 and are disposed radially above top dead center TDC of said piston. The orifices 48, 54 are situated axially on either side of the partition 42, on the intake chamber 16 side and the exhaust chamber 18 side, respectively.

The grooves 50a in the exhaust member of the dispensing means are disposed relative to the grooves 44a in the intake member such that when one of the grooves 44a faces the inlet orifice 48 of the metering chamber 22, none of the grooves 50a of the exhaust member are positioned facing the outlet orifice 54. In this intake position for the intake of product into the metering chamber 22, the outlet orifice 54 is closed off by the outer surface of the exhaust member, as illustrated in FIG. 1.

Conversely, in the exhaust position for the exhaust of product from the metering chamber 22, one of the grooves 50a faces the outlet orifice 54 and the outer surface of the intake member closes off the inlet orifice 48. Thus, the dispensing means 24 makes it possible to place the metering chamber 22 alternately into communication with the intake chamber 16 and the exhaust chamber 18.

The grooves 44a, 50a are arranged on the intake and exhaust members 34, 36 so as to prevent any communication of the metering member 22 with the intake chamber 16 and the exhaust chamber 18 during a compression phase of the pump cycle. The inlet orifice 48 and outlet orifice 54 are closed off by the outer surfaces of the intake and exhaust members. During this phase, the metering chamber 22 is temporarily isolated from the intake chamber 16 and from the exhaust chamber 18.

The grooves 44a, 50a are arranged on the dispensing means 24 and the movements of said means in rotation and of the piston 28 in translation are synchronized so as to obtain the pump cycle illustrated in the following table.

| Pump cycle | intake phase | delivery phase | compression phase | exhaust phase |
| --- | --- | --- | --- | --- |
| State of the inlet orifice | open | open | closed | closed |
| State of the outlet orifice | closed | closed | closed | open |
| Movement of the metering piston | downwards | | upwards | |

In the intake phase, the inlet orifice 48 of the metering chamber 22 is open while the outlet orifice 54 is closed. During this product intake phase, the metering piston 28 moves from top dead center TDC until it reaches bottom dead center BDC.

The intake phase is followed by a product delivery phase during which the inlet orifice 48 and outlet orifice 54 remain in the same state, namely open and closed, respectively. During this delivery phase, the metering piston 28 moves from bottom dead center BDC to top dead center TDC. The delivery phase makes it possible to ensure correct filling of the metering chamber 22.

The pump cycle continues with the product compression phase in which the inlet orifice 48 and outlet orifice 48 are closed, as indicated above. During this phase, the metering piston 28 continues its movement toward top dead center TDC and the metering chamber 22 is thus temporarily isolated from the intake chamber 26 and from the exhaust chamber 18. Any product communication between these chambers and the metering chamber 22 is prevented.

Next, the cycle ends with the product exhaust phase in which the inlet orifice 48 remains closed while the outlet orifice 54 is open. During this phase, the metering piston 28 moves until it reaches top dead center TDC.

In order to control the flow rate of the pump 10 at the outlet of the exhaust chamber 18, said pump comprises a pressure sensor 60 that permanently measures the pressure of the product inside the metering chamber 22, and a control unit 62 connected to said sensor by way of a connection 64. The sensor 60 continuously delivers information relating to the pressure of the product which is present in the metering chamber 22. By way of example, the sensor 60 may be of the piezoelectric type. The control unit 62 may for example be a microcontroller.

In the exemplary embodiment illustrated, the sensor is partially mounted in an orifice (not referenced) that is formed in the thickness of the cylinder 20 and leads into the metering chamber 22. The active part of the sensor 60 is situated inside this mounting orifice so as to be able to measure the pressure of the product situated inside the metering chamber 22. The active part of the sensor 60 is situated radially above top dead center TDC of the piston 28, i.e. radially between top dead center and the orifices 48, 54. Alternatively, it is possible to provide for the pressure sensor 60 to be mounted in a manner fixed against the bore of the cylinder 20 above top dead center TDC of the piston. In another variant, the sensor 60 can be fixed to the front face of the piston 28. In these two latter cases, the sensor 60 is mounted inside the metering chamber 22.

Figure 3:
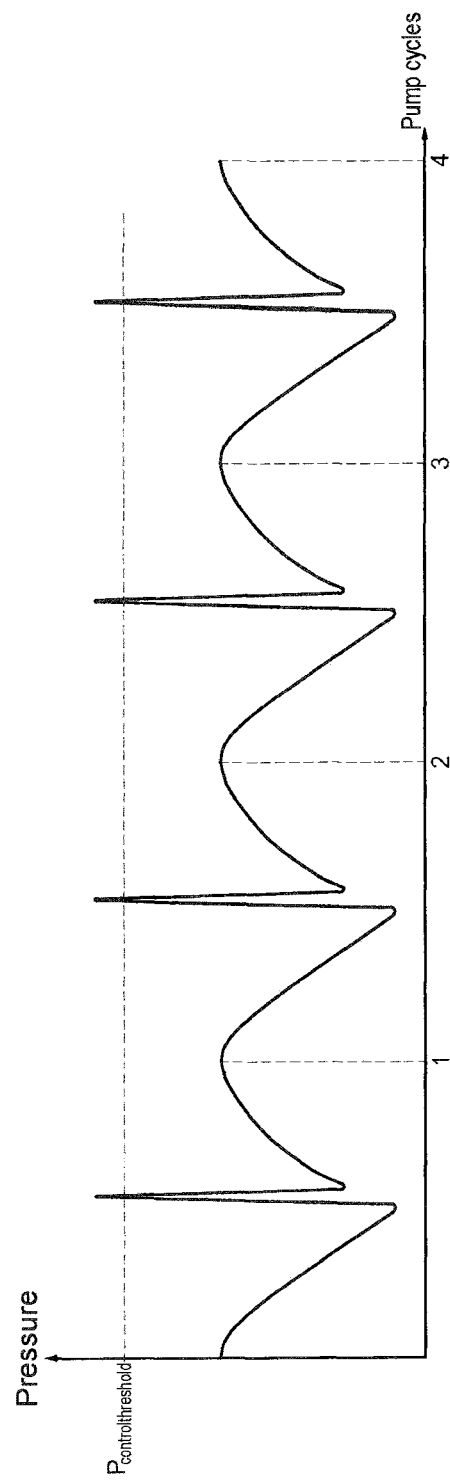

The control unit 62 comprises, in memory, all the hardware and software means for implementing the main steps of the method for controlling the flow rate of the pump from product pressure measurements which are taken by the sensor 60. The values measured by the sensor 60 are delivered continuously to the control unit 62, which acquires them so as to obtain the pressure curve of the product inside the metering chamber during successive pump cycles, as illustrated in FIG. 3. For reasons of clarity, the change in the pressure of the product, which is measured during different phases of each cycle, is illustrated in FIG. 4.

At the start of the intake phase, the pressure of the product decreases progressively in the metering chamber during the movement of the metering piston from top dead center TDC until it reaches bottom dead center BDC. During the following delivery phase, the pressure of the product continues to drop.

Next, during the compression phase, a product pressure peak 70 is created and has a value significantly greater than the pressure values measured during the rest of the pump cycle. This pressure peak 70 is representative of the state of compression of the product inside the metering chamber, which depends on the quantity of product contained. This is because, during this phase, the movement of the piston towards top dead center TDC compresses the product in the metering chamber, which is completely closed. At the start of the following exhaust phase, the pressure of the product drops abruptly and then increases again during the movement of the metering piston towards top dead center TDC.

The software means of the control unit 62 make it possible to continuously verify the presence of pressure peaks 70 having a value greater than or equal to a predetermined control pressure threshold $P_{control\ threshold}$, illustrated in FIG. 3. The presence of such pressure peaks makes it possible to ensure that the desired volume of product has been injected into the exhaust chamber of the pump during the exhaust phase of the pump cycle in question. The threshold $P_{control\ threshold}$ is a value representative of a state of satisfactory filling of the metering chamber. This value is defined in advance depending on the type of product pumped and the desired flow rate of the pump.

The software means of the control unit continuously calculate the ratio between the number of pressure peaks detected and the number of pump cycles carried out, and trigger a warning when this ratio is less than a predetermined warning threshold. The warning is transmitted for example to an operator before the pump is stopped.

By virtue of embodiments of the invention, it is possible to control the regularity of the flow rate of the pump by detecting the presence of pressure peaks inside the metering chamber during the compression phase of the pump cycles which is specifically provided to this end. The verification of satisfactory filling of the metering chamber ensuring a regular flow rate of the pump is effected by way of physical measurements inside the latter.

Embodiments of the invention have been illustrated on the basis of a volumetric pump comprising a rotary product dispensing means which is designed such that the functions of intake and exhaust are each carried out by a specific member. Aspects of the invention can also be applied to a pump comprising a dispensing means in the form of a rotary cylindrical plug comprising the two groups of grooves formed on its outer surface that pass in front of a single orifice. Aspects of the invention can also be applied to a pump comprising a dispensing means in the form of a sliding cylinder equipped with inlet and outlet flaps for closing off the intake and exhaust orifices, respectively, of the metering chamber.

The invention claimed is:

1. A method for controlling a flow rate of a volumetric pump comprising a product metering chamber, a metering piston mounted inside said chamber so as to slide between top dead center and bottom dead center, and an intake chamber and an exhaust chamber for a product that are placed alternately in communication with said metering chamber, the volumetric pump having a pump cycle comprising the following successive phases:
an intake phase in which an inlet orifice of the product metering chamber is open and an outlet orifice of the metering chamber is closed, and the metering piston moves from the top dead center until the metering piston reaches the bottom dead center,
a delivery phase in which the inlet orifice remains open and the outlet orifice remains closed, and the metering piston moves from the bottom dead center toward the top dead center,
a compression phase in which the inlet and outlet orifices are closed so as not to be in communication with the intake and exhaust chambers, and the metering piston continues to move toward the top dead center, and
an exhaust phase in which the inlet orifice remains closed and the outlet orifice is open, and the metering piston moves until the metering piston reaches the top dead center, the method comprising the steps of:
measuring a pressure of the product inside the metering chamber during at least one pump cycle using a product sensor, and
the measuring step including verifying a presence of a pressure peak having a value greater than or equal to a predetermined pressure threshold during the compression phase of said pump cycle;
wherein, during the compression phase, the outlet valve is held closed until after the presence of the pressure peak is verified.

2. A method according to claim 1, wherein the pressure of the product inside the metering chamber is measured during a plurality of successive pump cycles, and the presence of the pressure peaks is verified during the compression phase of each of said cycles.

3. A method according to claim 2, wherein a warning is output if a ratio between a number of pressure peaks detected and a number of pump cycles is less than a predetermined warning threshold.

4. A method according to claim 1, wherein said pressure threshold is defined in accordance with the flow rate of said pump and a type of product pumped.

5. A volumetric pump comprising:
a product metering chamber,
a metering piston mounted inside said chamber so as to slide between top dead center and bottom dead center,
a sleeve at least partially delimiting an intake chamber and an exhaust chamber for said product, and
a product dispenser movable with respect to the sleeve, the product dispenser places the metering chamber alternately into communication with the intake chamber and the exhaust chamber during operation, and the product dispenser temporarily isolates said metering chamber from any communication with said intake and exhaust chambers,
the movements of said product dispenser and the movements of said metering piston being synchronized so as to obtain a pump cycle comprising the following successive phases:
an intake phase in which an inlet orifice of said product metering chamber is open and an outlet orifice of said metering chamber is closed, and said metering piston moves from the top dead center until it reaches the bottom dead center,
a delivery phase in which said inlet orifice remains open and said outlet orifice remains closed, and said metering piston moves from the bottom dead center toward the top dead center,
a compression phase in which said inlet and outlet orifices are closed so as not to be in communication with said intake and exhaust chambers, and said metering piston continues to move toward the top dead center, and
an exhaust phase in which said inlet orifice remains closed and said outlet orifice is open, and said metering piston moves until it reaches the top dead center, and
wherein the volumetric pump further comprises a pressure sensor for measuring a pressure of the product inside the metering chamber, and a control unit that is connected to the pressure sensor and verifies the presence of pressure peaks exhibiting a value greater than or equal to a predetermined pressure threshold during the compression phases:
wherein, during the compression phase, the outlet valve is held closed until after the presence of the pressure peak is verified.

6. A pump according to claim 5, wherein the pressure sensor measures the pressure of the product in a zone of the metering chamber that is situated above the top dead center of the metering piston.

7. A pump according to claim 5, wherein an active part of the pressure sensor is mounted in an orifice formed in the thickness of a cylinder of said pump that delimits the metering chamber.

8. A pump according to claim 5, wherein an active part of the pressure sensor is mounted inside the metering chamber.

9. A pump according to claim 5, wherein the control unit calculates a ratio between a number of pressure peaks detected and a number of pump cycles carried out, and triggers a warning when this ratio is less than a predetermined warning threshold.

10. A pump according to claim 5, wherein the product dispenser is mounted so as to be able to rotate inside the sleeve and comprises grooves that place the metering chamber alternately into communication with the intake chamber and the exhaust chamber during operation.

* * * * *